(12) United States Patent
Saliger et al.

(10) Patent No.: US 7,152,408 B2
(45) Date of Patent: Dec. 26, 2006

(54) VEHICLE WITH A COMBUSTION ENGINE AND A FUEL CELL DEVICE

(75) Inventors: Rainer Saliger, Bamberg (DE);
Thomas Heid, Renchen-Ulm (DE);
Markus Koberstaedt, Usiar (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 10/976,062

(22) Filed: Oct. 28, 2004

(65) Prior Publication Data

US 2005/0091981 A1     May 5, 2005

(30) Foreign Application Priority Data

Oct. 29, 2003   (DE)   ............... 103 50 550

(51) Int. Cl.
*B60K 16/00*   (2006.01)
(52) U.S. Cl. ..................... 60/641.8; 60/698
(58) Field of Classification Search ........... 60/641.8, 60/698
See application file for complete search history.

(56) References Cited

U.S. PATENT DOCUMENTS 3,683,622 A * 8/1972 Von Krusenstierna ....... 60/207

| 5,293,857 | A  | * | 3/1994  | Meyer ............... 123/568.18 |
| 6,007,699 | A  | * | 12/1999 | Cole ................... 208/134 |
| 6,472,091 | B1 | * | 10/2002 | Konrad et al. .......... 429/13 |
| 6,502,533 | B1 | * | 1/2003  | Meacham ............... 123/3 |
| 6,834,623 | B1 | * | 12/2004 | Cheng ................ 123/1 A |
| 2002/0124836 | A1 | * | 9/2002 | Reddy ................ 123/518 |
| 2004/0149503 | A1 | * | 8/2004 | Faye et al. ........... 180/65.3 |
| 2006/0035122 | A1 | * | 2/2006 | Weissman et al. ....... 429/26 |

FOREIGN PATENT DOCUMENTS

DE    199 23 783 A1    11/2000
DE    199 26 495 A1    12/2000

* cited by examiner

*Primary Examiner*—Hoang Nguyen
(74) *Attorney, Agent, or Firm*—Michael J. Striker

(57) ABSTRACT

A vehicle having a combustion engine, a fuel cell device having a fuel cell unit, a compressed air storage for supply of a compressed air, a supply conduit provided between the fuel cell unit of the fuel cell device and the compressed air storage, for supplying the fuel cell unit with compressed air, and a further supply conduit provided between the combustion engine and the compressed air storage for supply of the combustion engine with compressed air.

7 Claims, 5 Drawing Sheets

VEHICLE WITH A COMBUSTION ENGINE AND A FUEL CELL DEVICE

CROSS-REFERENCE

The invention described and claimed hereinbelow is also described in German Patent Application 103 50 550.4, filed Oct. 29, 2003. This German Patent Application, whose subject matter is incorporated here by reference. Provides the basis for a claim of priority of invention under 35 U.S.C. 119 (a)–(d).

BACKGROUND OF THE INVENTION

The present invention relates to a vehicle with a combustion engine and a fuel cell device.

Vehicle drives, in which a fuel cell is utilized for production of electrical energy in connection with one or several electric motors became known particularly in connection with a so-called "Zero Emission Vehicle". Such vehicles are partially provided with a hydrogen tank, for supplying the fuel required for the operation of the fuel cell. In other embodiments additionally a device for fuel reforming is provided, in which conventional fuel which usually is available in form of hydrocarbons is chemically cracked, whereby the hydrogen required for the operation of the fuel cell is produced.

The overwhelming number of vehicles is however driven in foreseeable time as before by reciprocating piston motors, which are provided additionally with a current generator in form of a dynamo, to supply electrical peripheral devices with energy.

Modern motor vehicles are designed in increasing numbers with a plurality of consumers, for providing additional functions to improve the motor control, the comfort and the safety. This increases an electrical energy demand. This energy demand is taken care for example by so-called APU systems (Auxiliary Power Unit). This means that in a vehicle with a reciprocating piston motor a fuel cell device is provided for production of electrical energy. With corresponding APU systems electrical energy can be produced and used independently from the combustion engine.

Primarily for vehicle drives with fuel cells and/or turbocharged combustion engines, the response behavior during dynamic load changes is of important significance for subjects such as customer comfort and driving fit. In order to guarantee the fast air feeding of these systems in the case of load requirements, high requirements are needed correspondingly for the design of compressors and their drives. In modern combustion engines for example electronic auxiliary condensers are utilized for an improved response behavior of the motor.

Moreover, fuel cell devices in vehicles with internal combustion engines are known, wherein for example for emergency energy supply the fuel cell device can be operated by means of a pressurized oxidizing agent, in particular air oxygen, wherein among others a pressure storage is available for the oxidizing agent (as disclosed in DE 199 26 495 A1).

Furthermore, vehicles are known, wherein compressed air brake system of the vehicle or its compressed air storage is connected with a supply conduit for supply of air oxygen required for the fuel cell (as disclosed in DE 199 23 783 C2).

SUMMARY OF THE INVENTION

Accordingly, it is an object of the present invention to provide a vehicle with a combustion engine and a fuel cell device, in which the structural expenses when compared with the prior art are reduced and simultaneously the response behaviors of the system in case of dynamic load requirement are optimized.

In keeping with these objects and with others which will become apparent hereinafter, one feature of the present invention resides, briefly stated, in a vehicle, comprising a combustion engine; a fuel cell device having a fuel cell unit; a compressed air storage for supply of a compressed air; a supply conduit provided between said fuel cell unit of said fuel cell device and said compressed air storage, for supplying said fuel cell unit with compressed air; and a further supply conduit provided between said combustion engine and said compressed air storage for supply of said combustion engine with compressed air.

A vehicle in accordance with the present invention is characterized in that a further supply conduit for supplying the combustion engine with compressed air is provided between the combustion engine and the compressed air storage.

By means of the further, second supply conduit, which extends in particular from a joint compressed air storage, a multiple use of at least the compressed air storage both for the fuel cell unit and also for the combustion engine can be realized. For example the combustion engine is a conventional reciprocating piston engine and/or a hydrogen combustion engine, which has in some case a turbocharger. In accordance with the present invention a reduction of the available components with a very high dynamics both of the fuel cell unit and also of the combustion engine in the case of dynamic load changes is obtained.

Advantageously the supply conduits each have at least one regulating valve for regulation of the filling and/or emptying of the compressed air storage. With this feature an advantageous strategy for filling or emptying of the compressed air storage can be realized. Advantageously the function of filling of the compressed air storage is supported by a regulatable compressed air pump. For example the compressed air storage can supply compressed air to the combustion engine and/or to the fuel cell unit, simultaneously or with a time offset. Generally, an advantageous opening or closing of the regulating valve or valves which in some cases are available, can be realized with a separate electronic control unit.

An exchangeable compressed air storage is recommended. For example, at least one pressure generating unit is provided for producing the compressed air. Thereby a frequent exchange of the compressed air storage can be avoided, which improves the customer comfort. By means of the pressure generating unit which is carried on board, an approximately automatic filling of the compressed air storage can be realized, preferably depending on the demand, in particular with utilization of an electrical control unit with respective sensors, such as pressure sensors or the like.

In a special further embodiment of the present invention the pressure generating unit is formed as air- and/or exhaust gas condenser or turbocharger of the combustion engine and/or the fuel cell unit. Corresponding exhaust gas condenser or turbocharger are already used in modern vehicles many times. With this feature a multiple use of the exhaust gas turbocharger as a compressor or a pressure generating unit can be provided for filling the compressed air storage in advantageous manner. This also reduces the number of components of the vehicle, which lowers both the structural and financial expenses for realization of the invention. Advantageously the further supply conduit is arranged between the exhaust gas turbocharger and the compressed air storage.

Alternatively, or in combination with it, the pressure generating unit can be formed as a condenser of the fuel cell device. Modern fuel cell devices in many cases already have a compressor which is driven by the fuel cell unit, so that with this variant of the invention the number of the components in the vehicle is advantageously minimized by the multiple use.

Generally a vehicle can have both an exhaust gas condenser or a turbocharger and also a condenser of the fuel cell device or compressor of the fuel cell unit and a separate pressure generating unit. For example, the separate pressure generating unit of the compressed air storage is formed as a compressed air pump, a radial condenser, a mechanical charger, such as for example a positive blower, a screw condenser, a vane condenser, a spiral charger or the like, which, when compared with a compressor or condenser with a high compression ratio, can be formed structurally simpler. Correspondingly a relatively technically simple or cost favorable pressure generating units for generating the pressure of the compressed air storage can be also relied on. For example, standard components can be utilized for this purpose.

Furthermore, with the utilization of a separate pressure generating unit for the compressed air storage, a reduction of the requirements for the exhaust gas condenser or turbocharger and/or for the compressor or condenser of the fuel cell device can be obtained, which clearly can provide an efficiency optimal design of the total system or the corresponding components. In the prior art, exactly these components, in other words the exhaust gas turbocharger or the compressor of the fuel cell unit are designed so that they can also turn over comparitively high load requirements or peak loads. With the advantageous compressed air storage, corresponding peak requirements partially can be fulfilled better, so that the design directly of the exhaust gas condenser or the compressor of the fuel cell unit can be developed correspondingly in optimal fashion. This is especially true for the impeller design and the work demand of the running gear, since the requirement for a fast run up time can be dispensed with by means of the invention. This leads both to an increase of the total efficiency as well as to a cost-favorable design of the system.

Advantageously, a bypass unit to the surrounding of the compressed air storage is provided. This means that in general parallel to the compressed air storage, a bypass or a connection conduit is available for connection of the combustion engine or its components with the fuel cell or its components. With this feature for example a supply of the combustion engine components via the fuel cell device components can be realized. Frequently the combustion engine components have a comparatively high power, so that in certain operational or traveling conditions by means of the combustion engine compressed air can be advantageously supplied to the compressed air storage and/or the fuel cell unit. On the other hand, by means of the condenser of the fuel cell unit, a charging of air required for the combustion engine can be realized. In some cases an exhaust gas turbocharger can become unnecessary.

Generally, the combustion engine can use hydrogen and/or hydrocarbons, such as gasoline or diesel as fuel. Furthermore, the combustion engine can be operated both with or without an injection system.

Basically, by means of the on-board system or a control unit, an advantageous regulation ability of the compressed air storage, in particular in cooperation with the regulating valves and the regulatable compressed air generation unit, can be realized. For example, for filling or emptying of the compressed air storage, passive overpressure valves in some cases with a return stroke and/or electrically controllable valves can be utilized.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
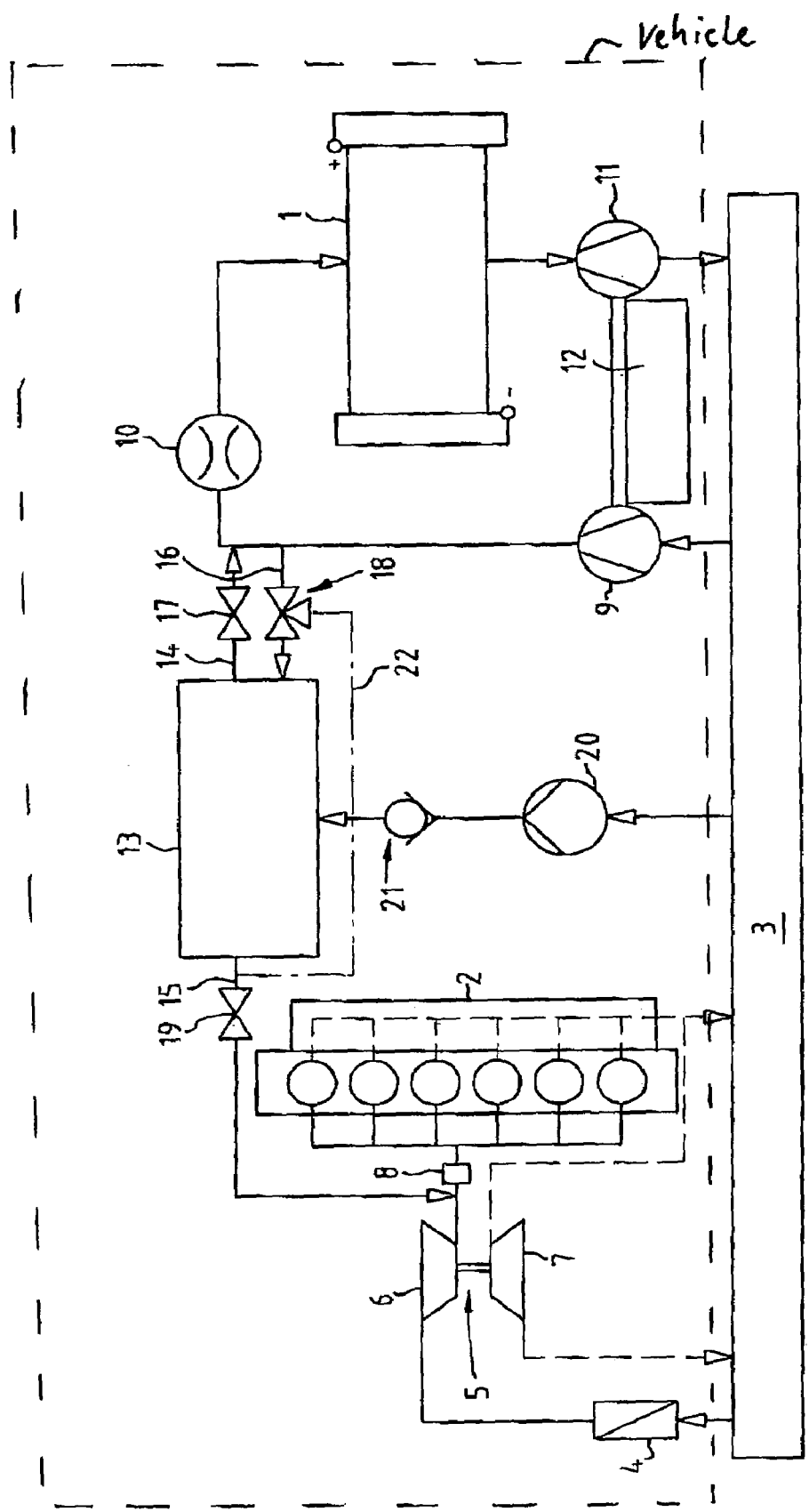
FIG. 1 is a view showing a schematic diagram of a vehicle in accordance with one variant of the present invention.

A fuel cell 1 and a combustion engine 2 are schematically shown in FIG. 1. Here only the air path of the fuel cell 1 or the motor 2 is shown, while the corresponding fuel path is not shown for the sake of clarity.

The illustrated components exchange air with the surrounding or environment 3. For example, the motor 2 is supplied with air via an air filter 4 and an exhaust gas turbocharger 5 as well as an HFM sensor 8. The air hereby is distributed or filled by means of a distribution system in the combustion chambers of the motor 2. Generally, an HFM (Heat Film Air Mass metering) means a system for the control of fuel injection and ignition, which is available for years. The exhaust gas turbocharger 5 has in particular a condenser 6 which is driven by a turbine 7, wherein it is operated by the exhaust gas of the motor 2.

The fuel cell 1 is supplied with air via a compressor 9 as well as a dosing or a flow rate counter 10. The air which flows out of the fuel cell 1 and is partially converted, is discharged via an expander 11 again to the environment 3. The expander 11 drives the compressor 9 partially with support by an electric drive 12.

A compressed air storage 13 is provided between the components of the combustion engine 2 and the fuel cell 1. The storage 13 is connected by a conduit 14 or 16 with the fuel cell 1 or its components. The conduits 14 or 16 include regulating valves 17 or 18. In contrast to the variant shown in FIG. 1, also a consolidation of the conduits 14 and 16 over the valves 17 and 18 with a preferable use of a correspondingly formed or operating single valve can be provided, not shown.

Furthermore, the compressed air storage 13 can be advantageously connected with the motor 2 or its distribution system for the combustion air, by means of a conduit 15 which has a valve 19. The compressed air storage 13 in accordance with the variant shown in FIG. 1, is supplied by means of a pressure air sensor 20 and a check valve 21. With the utilization of the compressed air storage 13, in particular the compressor 9 as well as the condenser 6 inclusive of the drive (electrical, turbine) can be designed or operated for optimal efficiency, so that the requirement for a fast run up behavior of the running gear is dispensed with.

In contrast to the prior art, in which the compressor 9 as well as the condenser 6 must follow dynamic load changes fast, these components in accordance with the present invention can be designed optimally for the relevant operational regions of the combustion engine or the fuel cell, since corresponding peak load changes are buffered or absorbed by the compressed air storage 13. With this system a very high dynamics both of the motor 2 as well as of the fuel cell 1 can be realized.

Moreover, as can be seen from FIG. 1 a bypass 22 is available parallel to the compressed air storage 13. By means of the bypass 22, for example the combustion engine can be supplied with the fuel cell-compressor air and vice versa charging of the compressor air of the fuel cell system can be realized.

Figure 2:
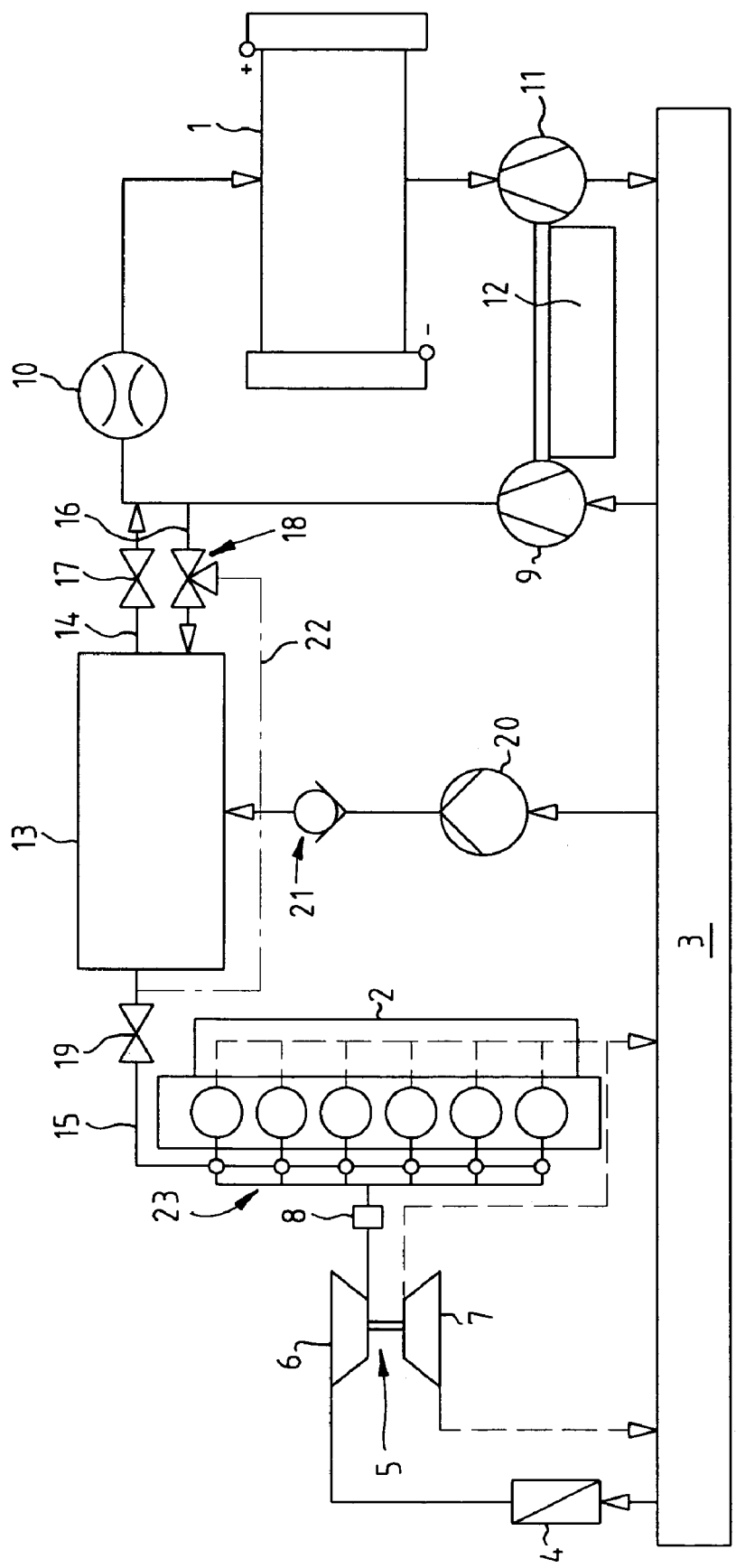
FIG. 2 is a view showing a schematic diagram of a vehicle in accordance with a further inventive variant.

FIG. 2 shows a further variant of the vehicle in accordance with the present invention, where similar or identical elements are identified with the same reference numerals as in FIG. 1. In contrast to FIG. 1, the motor 2 has air containing injection valves 23.

Figure 3:
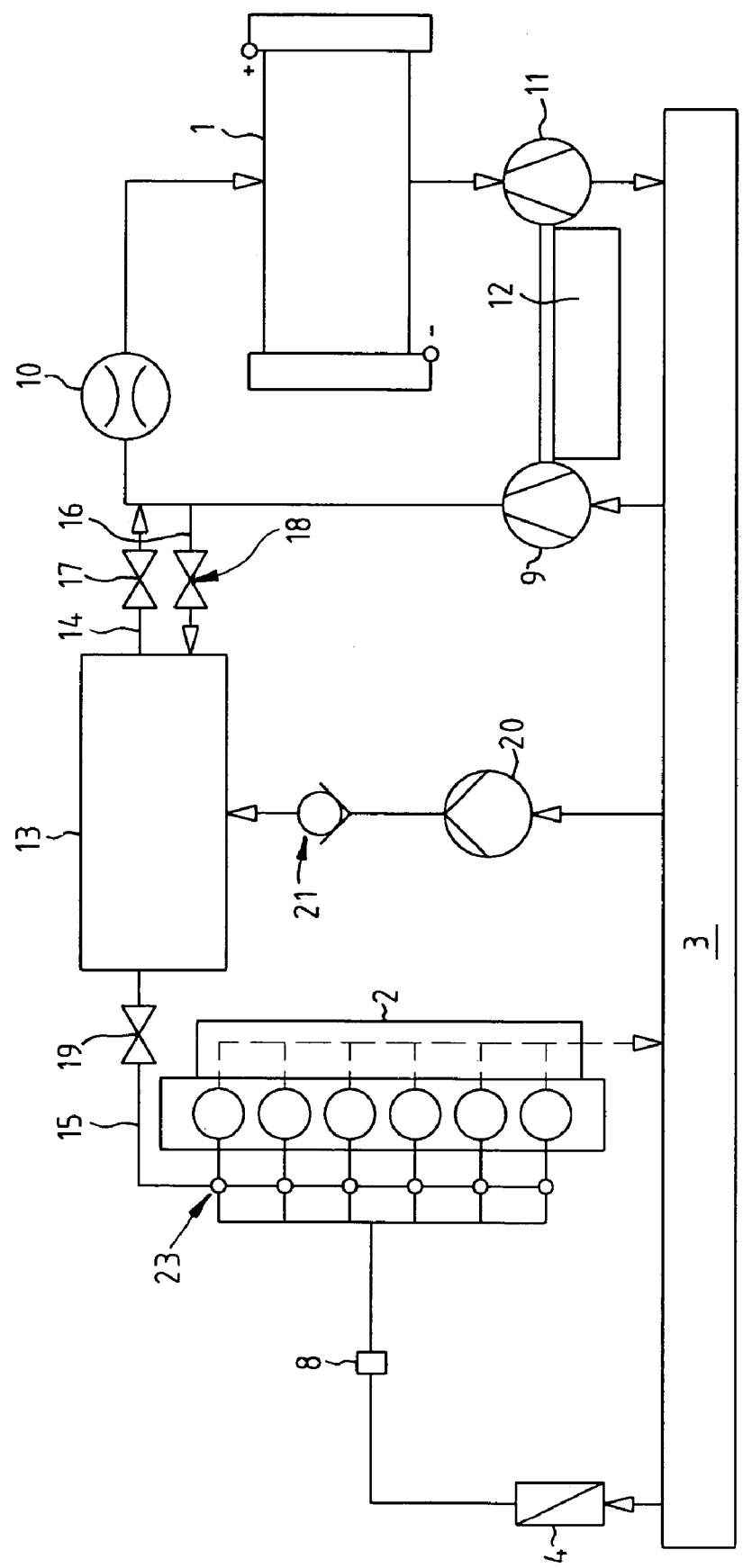
FIG. 3 is a view showing a schematic diagram of a vehicle in accordance with a third inventive variant.

FIG. 3 shows a further variant of the vehicle in accordance with the present invention. In contrast to the embodiment shown in FIG. 2, it has no bypass 22 as well as no exhaust gas turbocharger 5. Otherwise, this variant corresponds to the variant of FIG. 2.

Figure 4:
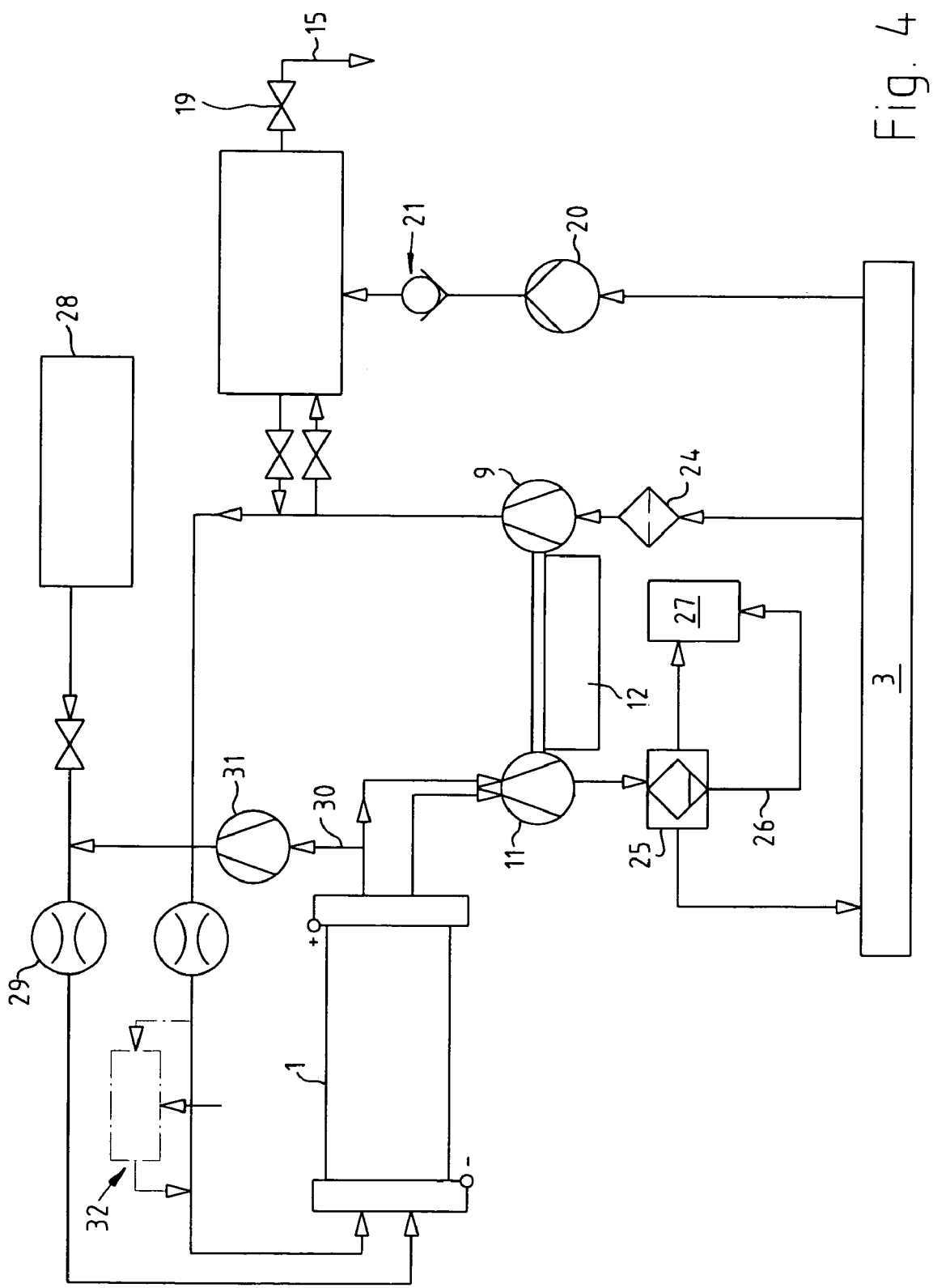
FIG. 4 is a view showing a schematic diagram of a vehicle in accordance with an inventive variant, with additional details.

FIG. 3 schematically shows a fourth variant of the vehicle in accordance with the present invention, wherein comparable elements are again identified with the same reference numerals. FIG. 4 clarifies further components of the inventive system, wherein in particular the fuel or hydrogen path of the fuel cell 1 is shown in considerable part. To the contrary, a detailed illustration of the motor system is dispensed with for clarity.

In contrast to the preceding figures, a filter 24 is connected before the compressor 9. Furthermore, a condensate separator 25 is connected after the expander 11, wherein the condensate is supplied to an intermediate storage 27. Without further illustration, the condensate 26 can be used for example for humidifying of the fuel cell unit and/or the hydrogen, etc. For this purpose, among others, a humidifier 32 is provided in particular for humidifying the fuel cell air, wherein in FIG. 4 it is connected parallel in a bypass.

FIG. 4 further shows a hydrogen tank 28, which supplies the hydrogen via a dosing element 29 to the fuel cell 1. The partially converted residual gas, which includes a residual hydrogen in a certain quantity, is supplied by means of return conduit 30 or a hydrogen pump 31 for feeding into the fuel cell 1.

Figure 5:
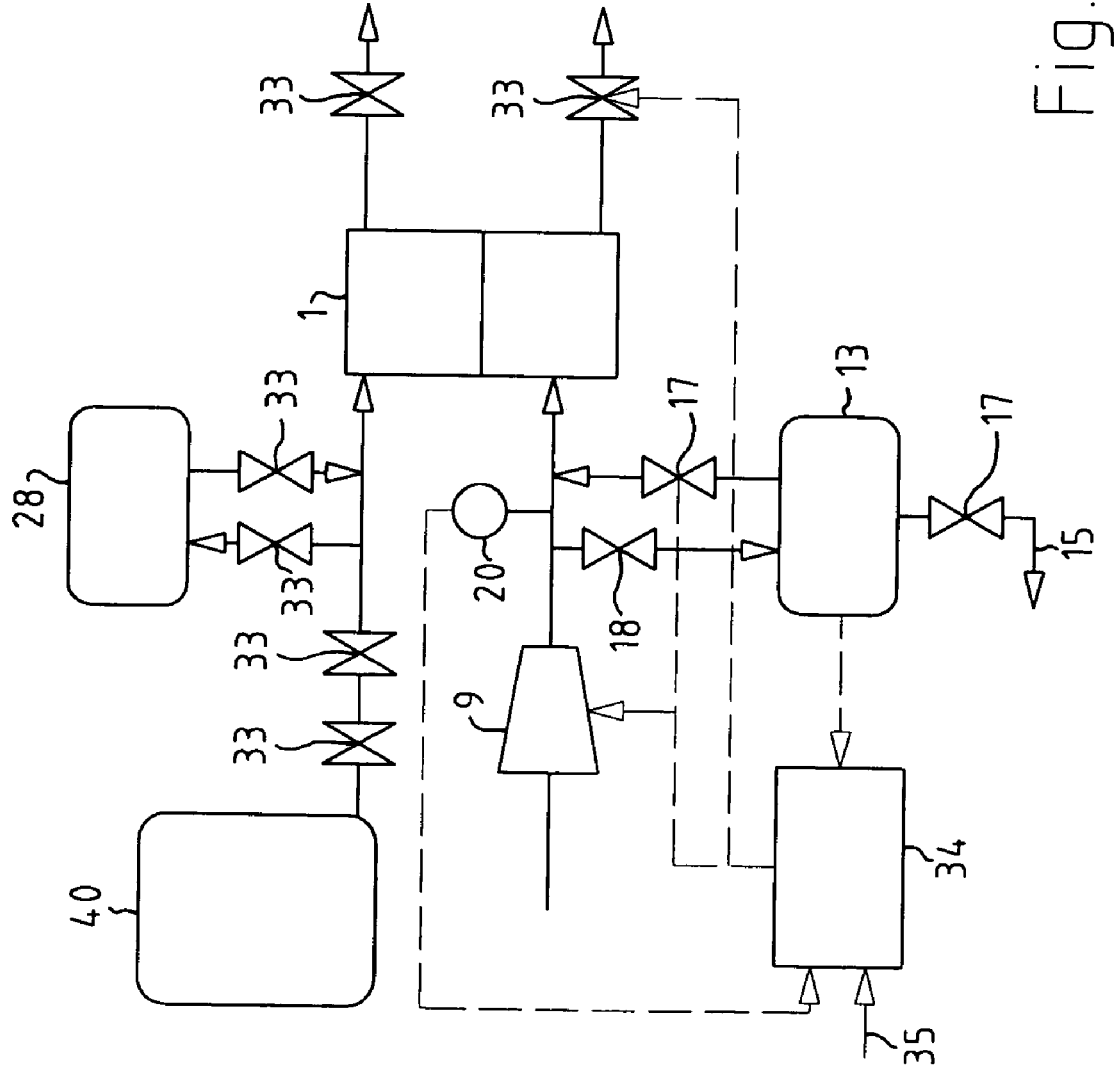
FIG. 5 is a view showing a schematic diagram of a vehicle in accordance with a further inventive variant with other details.

In FIG. 5 a further variant of the vehicle in accordance with the present invention is shown, wherein in particular the hydrogen path is shown as well as parts of the control unit. For example, the fuel cell 1 can be supplied with hydrogen by means of a hydrogen tank 40. Alternatively, for this purpose however the component 40 can be formed as a gas generating unit, in particular as a reformer in some cases with purification stages, wherein the reformer is connected through the pressure regulating valves 33 with the fuel cell 1. The fuel cell 1 at the outlet side also has the pressure regulating valves 33.

A controller 34 can be provided for control or regulation of the system. Its input variables come in particular from the compressed air storage 13, the sensor 30, a power requirement 35. Controller-output variables are used in particular for regulation or control of the valves of the whole system and/or of the condensers 9, 5.

Generally, in accordance with the present invention when compared with the prior art, the storage content of an additionally available electrical power or energy storage can be significantly reduced. By means of the process for filling the containers 13, 28 and for dosed discharge of the stored gas in operational conditions with high dynamic requirements, without detailed showing, the pressure difference between the required ideal system pressure and the actual system pressure differences can be provided as guidance variables. They can be generally determined by means of advantageous, not shown further pressure sensors.

Frequently during a driving cycle there are loading conditions, in which the fuel cell 1 requires only low powers. In this condition only low pressures are produced by the compressor 9 on the cathode side, and correspondingly low the pressure must be regulated on the anode side with the pre-connected valves, for example by means of a pressure regulator. When from this condition a fast acceleration of the vehicle takes place, analogously to it in the case of a APU applications is the connection of a large consumer such as an air conditioning compressor or the like, it lasts partially in the prior art for 1 to 5 seconds, until the new, delivered power, for which a higher pressure is required, is on.

For bridging this time, in accordance with the present invention gas is taken from the intermediate storage 13 for air, in the case of two long delays in the gas supply for the fuel cell also from the optionally used hydrogen storage 28, that is supplied to the fuel cell, 1 in case of pressures greater than the ideal operational pressure. The dosing is performed via the valves 17 or 33 shown in FIG. 5, which can be formed both passive, or in other words opening for example at a differential pressure greater than 0.5 bar, or active, in other words controlled by the control device 34. The ideal operational pressure as a function of the required power is provided here in the control device 34 by a curve (p(sys_ideal)=f(P(required)).

For filling the storage tank 13, ideally operational conditions are selected, in which a high pressure is provided in the system, which for example by releasing a gas pedal still exit and is to be reduced. The reaction gases under high pressure no longer find any use in view of the significantly lowered performance acceptance. For filing the tanks 13, 28, also passive overpressure valves with a return stroke can be utilized or electrically controlled valves.

The pressure reduction in driving situations, in which the pressure lies over the ideal operational pressure (p(P_required)), must be carried out first via opening of the valve 18 in FIG. 5 and filling the pressure storage 13. The pressure regulating valve 33 (at an output side of the fuel cell) must be controlled in this course differently. When $\Delta p(=p(sys\_actual)-p(sys\_ideal)$ is greater than zero, then the valve 18 opens for pressure storage filling, when $\Delta p$ is smaller than zero, for example in case of high sudden power requirements the valve 17 opens. When in the first case the pressure storage 13 is already filled, the pressure reduction as before must be performed exclusively by the pressure regulating valve 33 arranged at an output side behind the fuel cell 1. In the second case, a fast pressure buildup in the system can be provided by the buffer effect of the storage 13, 28 (with knowledge of the level) and accordingly slower and thereby efficiency optimal control of the compressor 9.

In certain conditions with this process it is possible, with knowledge of the level of the pressure container 13, 28, to operate the compressor 9, in particular in cooperation with the valves, or the system in favorable efficiency regions, and thereby to reduce the parasitic power consumption of the compressor 9.

The use of a hydrogen intermediate storage 28 directly before the fuel cell 1 is offered in particular in the case, in which for production of the hydrogen reforming or gas purifying stages are connected in series. The time constants for the hydrogen supply with conventional processes lasts with a load jump without the storage 28 frequently more than 10 seconds, which makes necessary a buffering by means of the storage 28.

Basically, the important advantages of the invention reside in the multiple use of the pressure system for the fuel cell 1 and the motor drive 2, with minimal modification expenses of conventional individual components. The compressed air storage 13 fed in stationary vehicle operating points by the compressed air pump, so that particularly high dynamic requirements for the electrical condenser drives, for example injection valves, connected with corresponding on-board and energy storage load are dispensed with. In particular, this pressure storage unit 13 can be utilized with corresponding design for the simultaneous dynamic operation of a turbo-charged combustion engine 2 and a PEM fuel cells-auxiliary power unit, for example for the so-called Clean Energy Concept vehicle. Furthermore, the compressors inclusive of drive efficiency can be designed and operated optimally, since the high dynamic requirements are fulfilled in advantageous manner by the compressed air storage 13.

It will be understood that each of the elements described above, or two or more together, may also find a useful application in other types of constructions differing from the types described above.

While the invention has been illustrated and described as embodied in a vehicle with a combustion engine and a fuel cell device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A vehicle, comprising a combustion engine; a fuel cell device having a fuel cell unit; a compressed air storage for supply of a compressed air; a supply conduit provided between said fuel cell unit of said fuel cell device and said compressed air storage, for supplying said fuel cell unit with compressed air; and a further supply conduit provided between said combustion engine and said compressed air storage for supply of said combustion engine with compressed air.

2. A vehicle as defined in claim 1; and further comprising at least one regulating valve provided for each of said supply conduits for cooperation with said compressed air storage in a manner selected from the group consisting of filling, emptying, and both of said compressed air storage.

3. A vehicle as defined in claim 1; and further comprising at least one regulatable pressure generating unit for producing the compressed air and for filling said compressed air storage.

4. A vehicle as defined in claim 3, wherein said pressure generating unit is formed as an exhaust gas condenser of said combustion motor.

5. A vehicle as defined in claim 3, wherein said pressure generating unit is formed as a condenser of said fuel cell device.

6. A vehicle as defined in claim 1; and further comprising a bypass unit for bypassing said compressed air storage.

7. A vehicle as defined in claim 1; and further comprising a pressure generating unit of said fuel cell unit, which is formed for supplying said combustion engine during a dynamic operation.

* * * * *